(12) United States Patent
Sharma et al.

(10) Patent No.: US 11,582,233 B2
(45) Date of Patent: *Feb. 14, 2023

(54) SECURE AUTHENTICATION OF DEVICES FOR INTERNET OF THINGS

(71) Applicant: Aeris Communications, Inc., San Jose, CA (US)

(72) Inventors: Narendra Sharma, Sunnyvale, CA (US); Yixiang Chen, Palo Alto, CA (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/190,669

(22) Filed: Mar. 3, 2021

(65) Prior Publication Data

US 2021/0185042 A1 Jun. 17, 2021

Related U.S. Application Data

(63) Continuation-in-part of application No. 16/197,546, filed on Nov. 21, 2018, now Pat. No. 10,943,005.

(Continued)

(51) Int. Cl.
*H04L 9/40* (2022.01)

(52) U.S. Cl.
CPC ...... *H04L 63/0876* (2013.01); *H04L 63/0236* (2013.01); *H04L 63/045* (2013.01); *H04L 63/20* (2013.01)

(58) Field of Classification Search
CPC ............. H04L 63/0876; H04L 63/0236; H04L 63/045; H04L 63/20; H04L 63/0823;

(Continued)

(56) References Cited

U.S. PATENT DOCUMENTS 9,344,437 B2 5/2016 Svigals
9,780,954 B2 10/2017 Bhattacharya
(Continued)

FOREIGN PATENT DOCUMENTS

WO 2016171295 10/2016

OTHER PUBLICATIONS

Li et al., "Securing the Internet of Things", Syngress, Dec. 31, 2017, retrieved from: https:/universalflowuniversity.com/Books/Computer%20Programming/Software%20Security%20and%20Privacy/Securing%20the%20Internet%20of%20Things.pdf.
(Continued)

*Primary Examiner* — Said M Elnoubi
(74) *Attorney, Agent, or Firm* — Brundidge & Stanger, P.C.

(57) ABSTRACT

A computer-implemented system and method for secure authentication of IoT devices are disclosed. The method for secure authentication of IoT devices comprises establishing a network connection with a network operator server via a control channel, establishing identity of the network operator server using a pre-shared server key from one or more of pre-shared server keys, establishing identity of the IoT device using a pre-shared client key from one or more of pre-shared client keys and cryptographically generating a session key for a network session to allow secure data exchange between the network operator server and the IoT device. The cryptographically generated session key is used for securely authenticating application running on the authenticated IoT device.

15 Claims, 9 Drawing Sheets

Related U.S. Application Data

(60) Provisional application No. 62/589,744, filed on Nov. 22, 2017.

(58) Field of Classification Search
CPC ... H04L 63/0869; H04L 67/12; H04L 67/146; H04L 63/083; G06F 21/602; G06F 21/445; H04W 4/70; H04W 12/069; H04W 12/40

See application file for complete search history.

(56) References Cited

U.S. PATENT DOCUMENTS

| | | |
|---|---|---|
| 9,888,385 B1 | 2/2018 | Oh |
| 9,935,954 B2 | 4/2018 | Smadja |
| 9,949,130 B2 | 4/2018 | Ophir |
| 9,954,956 B2 | 4/2018 | Adrangi |
| 10,015,146 B2 | 7/2018 | Bhattacharyya |
| 2015/0222517 A1* | 8/2015 | McLaughlin ........... H04L 43/10 713/171 |
| 2015/0312038 A1* | 10/2015 | Palanisamy .......... G06Q 20/385 713/155 |
| 2017/0169234 A1 | 6/2017 | Camiel |
| 2017/0250979 A1 | 8/2017 | Benson et al. |
| 2017/0272944 A1 | 9/2017 | Link, II |
| 2017/0295491 A1 | 10/2017 | Gehrmann |
| 2018/0007140 A1 | 1/2018 | Brickell |
| 2018/0116004 A1 | 4/2018 | Britt |
| 2018/0206117 A1* | 7/2018 | Stahl ................... H04W 12/069 |
| 2018/0262472 A1 | 9/2018 | Frederick |
| 2019/0036896 A1* | 1/2019 | Khushu ................. H04W 12/06 |

OTHER PUBLICATIONS

Park et al., "Mutual Authentication Scheme in Secure Internet of Things Technology for Comfortable Lifestyle", MDPI, Dec. 25, 2015.retrieved from: www.mdpi.com/1424-8220/16/1/20/pdf.

International Search Report and Written Opinion from International Application No. PCT/US18/62184 dated Mar. 18, 2019.

* cited by examiner

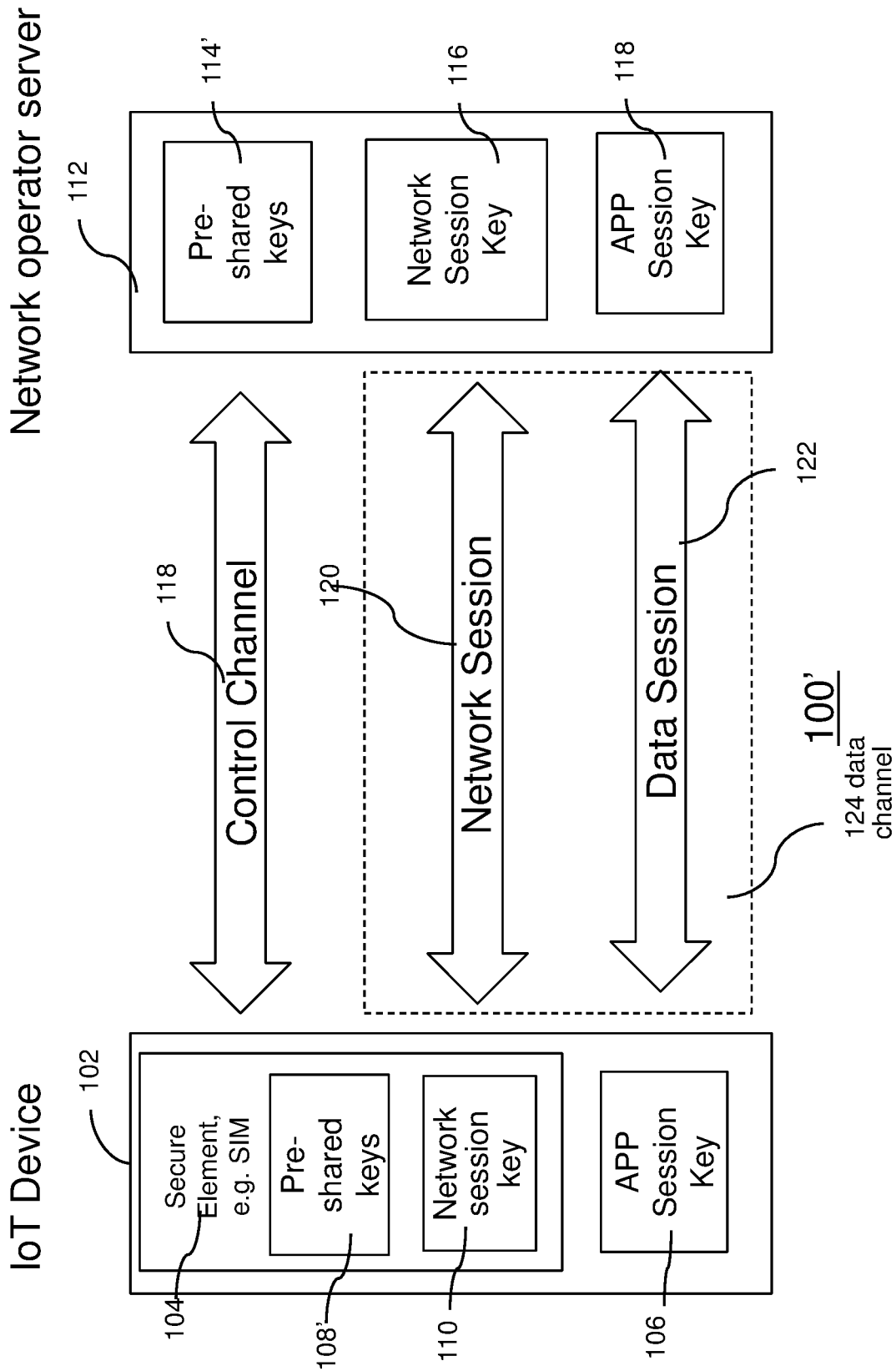

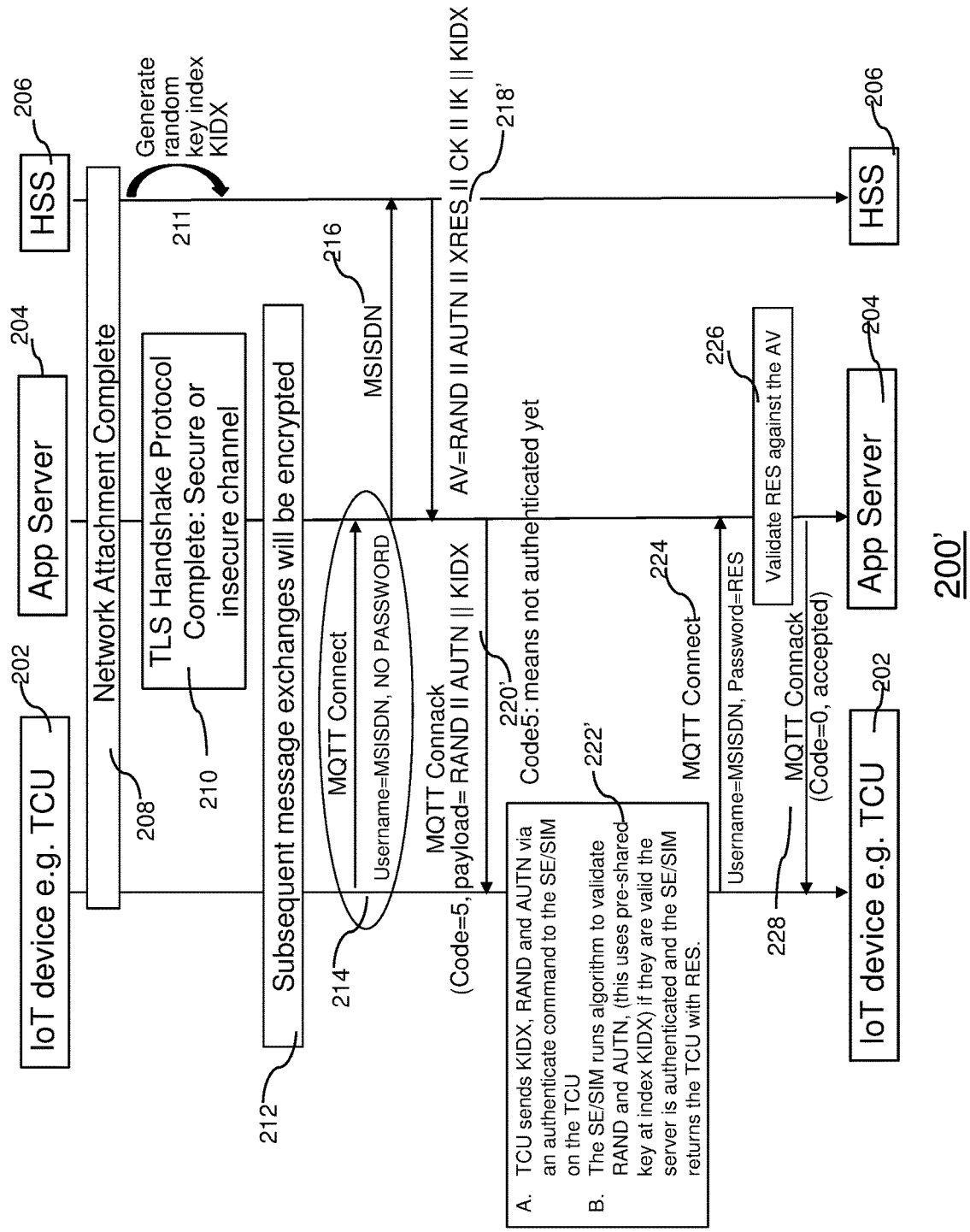

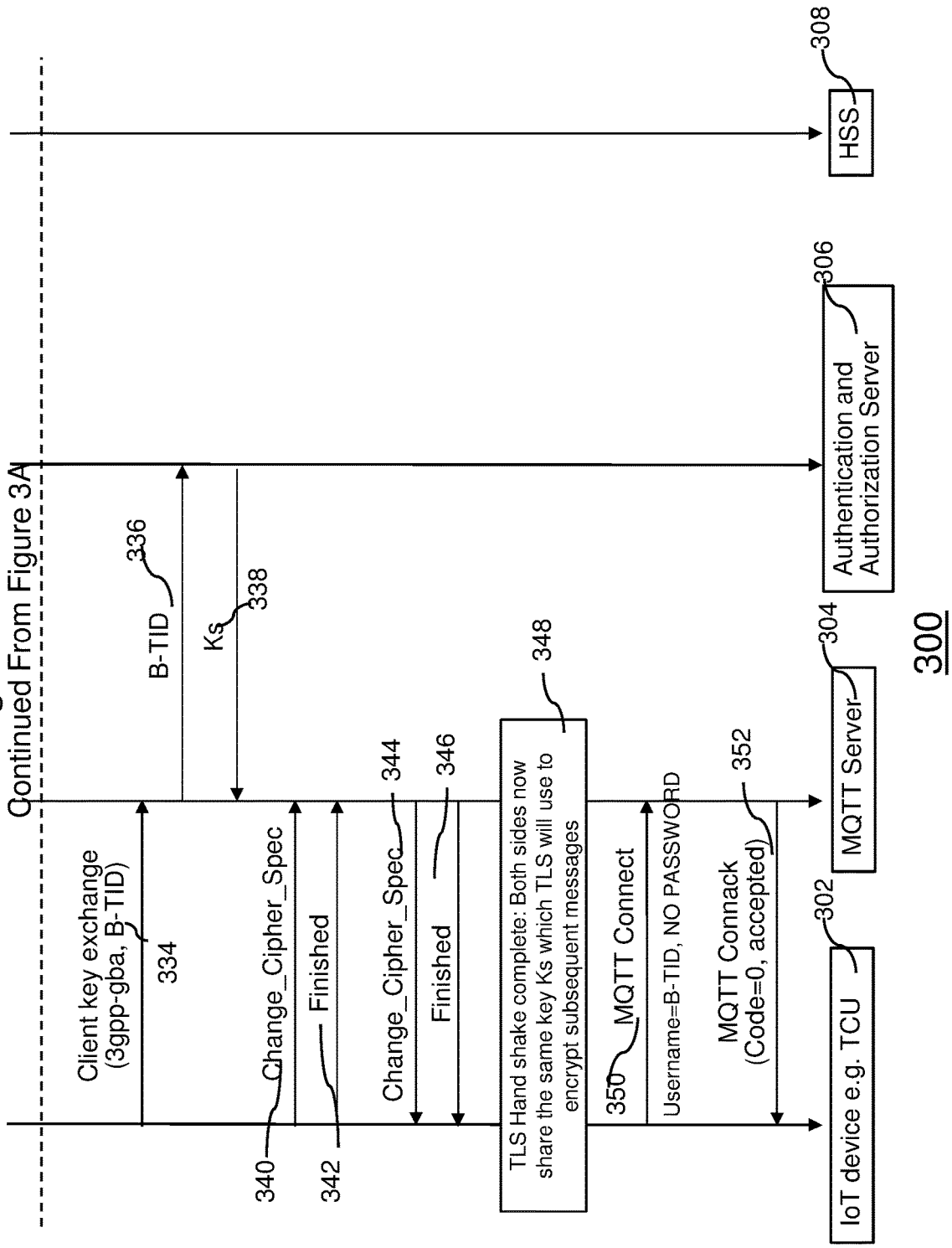

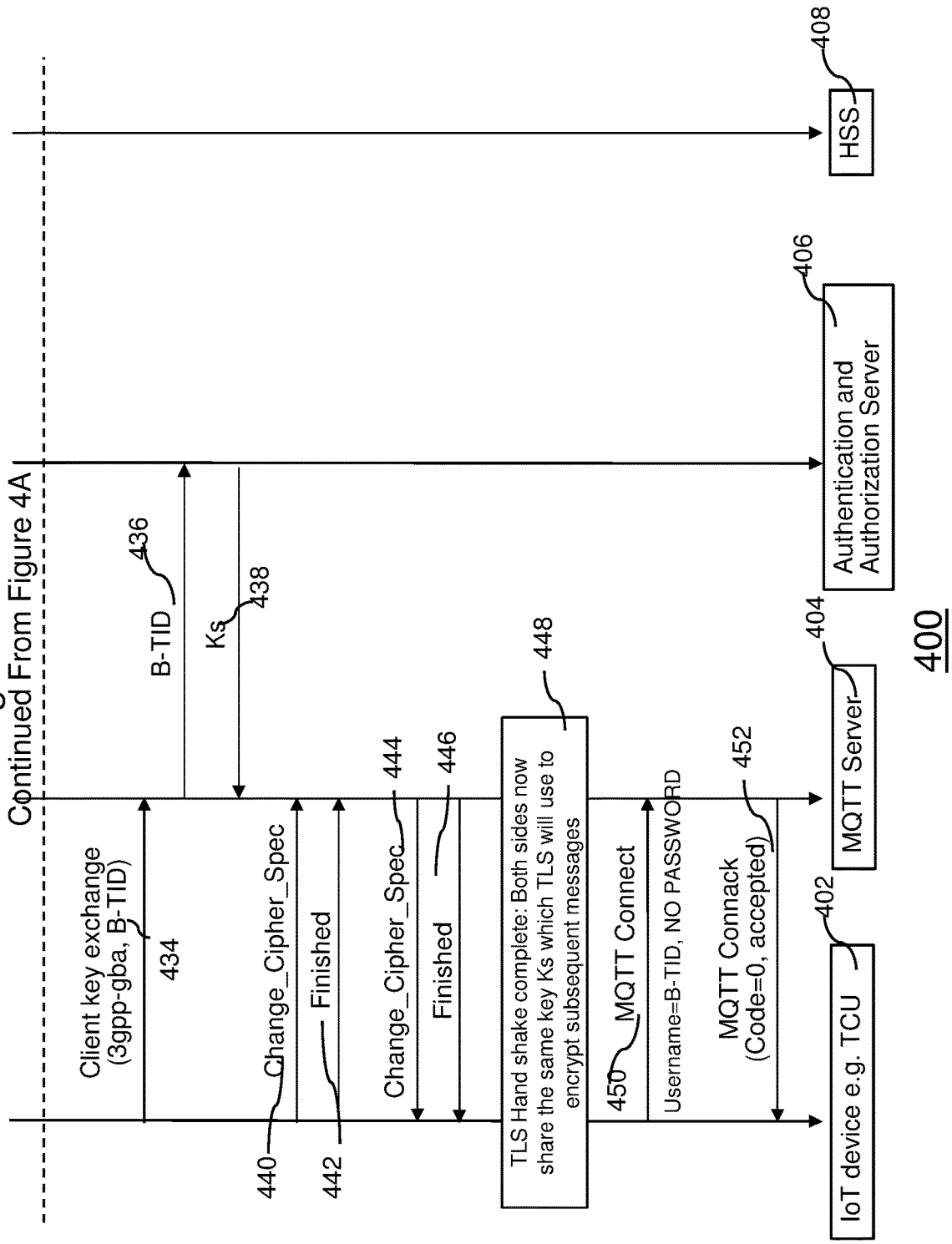

SECURE AUTHENTICATION OF DEVICES FOR INTERNET OF THINGS

CROSS-REFERENCE TO RELATED APPLICATIONS

This application is a Continuation-in-Part application of and claims priority to U.S. application Ser. No. 16/197,546, filed on Nov. 21, 2018, which claims priority to U.S. provisional application Ser. No. 62/589,744, entitled "SECURE AUTHENTICATION OF DEVICES FOR INTERNET OF THINGS", filed on Nov. 22, 2017, all of which are herein incorporated by reference in their entirety.

FIELD OF THE INVENTION

The present invention relates generally to a secure mutual authentication of a device containing a product that enables connectivity for M2M or Internet of Things (IoT) devices to cellular and/or other wireless services and a server from a service provider that provides the cellular and/or other wireless services.

BACKGROUND

Devices, whether phones, radios or other types of hardware, known as M2M or Internet of Things (IoT) devices, that are intended to connect to networks, such as wireless or cellular networks, must be enabled to connect to such networks, such as by use with products such as Subscriber Identification Modules (SIMS) and SIM card as secure element (SEISM). SIMS ordinarily are associated with a user's account and subscription with the network operator and authenticated by the network operator to connect to the network using an authentication protocol before any applications on the network can be accessed by the product containing that SIM or SE/SIM. This is typically done where an IoT device and a server must establish their respective identities to each other before communicating sensitive information with the network operator. This protocol is commonly known as mutual authentication.

Additionally, once the device and the server are authenticated, using applications on the device in combination with the server requires further authentication. This authentication is generally achieved by providing a username/password to gain access. In the case IoT, since there is no manual interaction, this process can be either very cumbersome or expensive due to use of Over The Air (OTA) time.

Accordingly, what are needed are system and method to address the above identified issues. The present invention addresses such a need.

SUMMARY

A computer-implemented system and method for secure authentication of devices for Internet of Things are disclosed. The method for secure authentication of IoT devices comprises establishing a network connection with a network operator server via a control channel, establishing identity of the network operator server using a pre-shared server key from one or more of pre-shared server keys, establishing identity of the IoT device using a pre-shared client key from one or more of pre-shared client keys, and cryptographically generating a session key for a network session to allow data exchange between the network operator server and the IoT device. The cryptographically generated session key is used for securely authenticating application running on the authenticated IoT device.

The system for secure authentication of IoT devices comprises a secure element for establishing a network connection with a network operator server via a control channel, wherein the secure element establishes identity of the network operator server using a pre-shared server key from one or more of pre-shared server keys, and identity of the IoT device using a pre-shared client key from one or more of pre-shared client keys; and a session key generator for cryptographically generating a session key for a network session to allow data exchange between the network operator server and the IoT device cryptographically generating a session key for a network session to allow data exchange between the network operator server and the IoT device. The cryptographically generated session key is used for securely authenticating application running on the authenticated IoT device.

In an embodiment, a computer program product for secure authentication of IoT devices is also disclosed. The computer program product stored on a non-transferable computer readable medium for secure authentication of IoT devices, comprising computer readable instructions for causing a computer to control an execution of an application for secure authentication of IoT devices comprising establishing a network connection with a network operator server via a control channel, establishing identity of the network operator server using a pre-shared server key from one or more of pre-shared server keys, establishing identity of the IoT device using a pre-shared client key from one or more of pre-shared client keys, and cryptographically generating a session key for a network session to allow data exchange between the network operator server and the IoT device. The cryptographically generated session key is used for securely authenticating application running on the authenticated IoT device.

In an embodiment the generated session key comprises a pair of session keys where one session key is for the network operator server and the other session key is for the IoT device.

BRIEF DESCRIPTION OF THE DRAWINGS

FIGS. 1A and 1B illustrate exemplary systems and processes 100 and 100' of mutually authenticating a device containing a SIM or SE/SIM and an application and a network provider server in accordance with an embodiment of the present invention.

FIGS. 2A and 2B illustrate exemplary systems and methods 200 and 200' using machine-to-machine (M2M)/"Internet of Things" (IoT) connectivity protocol (MATT) client authorization in accordance with one or more embodiments of the present invention.

FIGS. 3A and 3B illustrate an exemplary system and method 300 using Pre-shared Key-Transport Layer Security (PSK-TLS) in accordance with an embodiment of the present invention.

FIGS. 4A and 4B illustrate an exemplary system and method 400 using Pre-shared Key-Transport Layer Security (PSK-TLS) in accordance with an embodiment of the present invention.

DETAILED DESCRIPTION

Figure 1A:
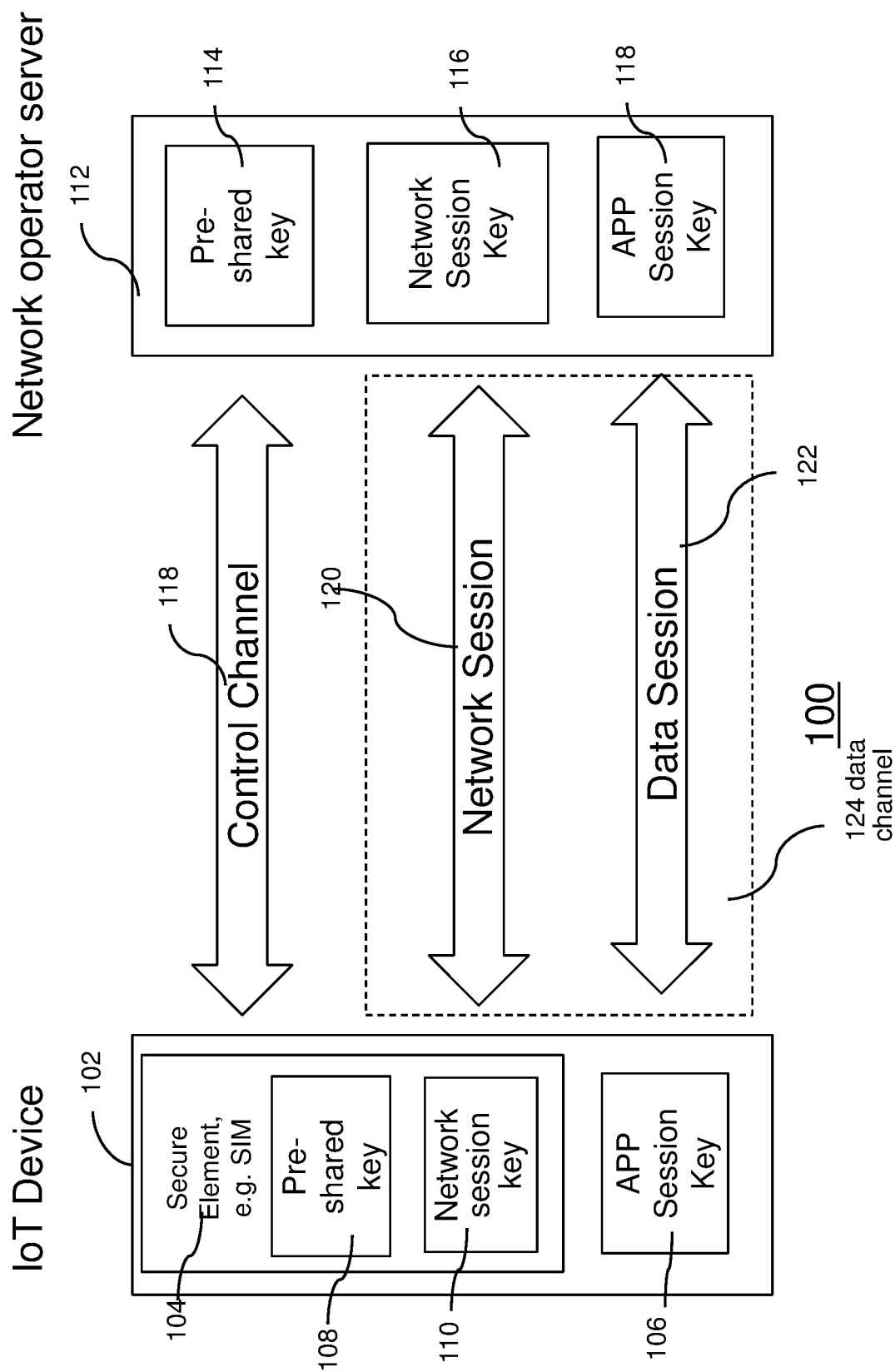

The present invention relates generally to a secure mutual authentication of a product that enables connectivity for M2M or Internet of Things (IoT) devices to cellular and/or other wireless services and a server from a service provider that provides the cellular and/or other wireless services.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Although the invention is described with respect to product such as a Subscriber Identification Module (SIM) and SIM card as a secure element (SE/SIM), as used herein the term "product" is intended to be inclusive, interchangeable, and/or synonymous with appliances, electronic modules, telephony equipment and other similar products that require registration of distinct identifying numbers, such as ICCIDs, IMSIs, MEIDs or other serial numbers as described further below and collectively referred to herein as "numbers", for that product with a service provider to receive services, though one will recognize that functionally different types of products may have characteristics, functions and/or operations which may be specific to their individual capabilities and/or deployment.

There are three fundamental requirements for secure communication between an IoT device and a network service provider, namely, authentication, authorization and confidentiality. For example, in a vehicle, the three fundamental requirements for secure communication between the Telematics Control Unit (TCU) and the Telematics Service Provider TSP may be explained as follows: 1. Authentication: the identity of the TCU must be authenticated before it accesses any service on the App server of TSP and vice versa; 2. Authorization: TCU can only access services that are restricted to that TCU, for example, TCU should not be able to listen to location reports from another TCU and 3. Confidentiality: communication between the TCU and the TSP must remain opaque to an eavesdropper.

Devices, whether phones, radios or other types of hardware, known as M2M or Internet of Things (IoT) devices, that are intended to connect to networks, such as wireless or cellular networks, must be enabled to connect to such networks, such as by use with products such as Subscriber Identification Modules (SIMs) and SIM card as a secure element (SE/SIM). SIMs and SE/SIMs are ordinarily associated with a user's account and subscription and are authenticated by the network operator using an authentication protocol before any applications on the network can be accessed by the device containing that SIM or SE/SIM. This is typically done where an IoT device and a server must establish their respective identities to each other before communicating with sensitive information with the network operator. This protocol is commonly known as mutual authentication.

Additionally, once the IoT device and the network operator server are authenticated, using applications on the device in combination with the server requires further authentication and/or authorization. Generally, this is achieved by providing a username/password to gain access. In the case IoT, since there is no manual interaction this process can be either very cumbersome or expensive due to use of Over The Air (OTA) time.

Different authentication methods may be used for authenticating devices using cellular or other wireless networks, each with their respective advantages and disadvantages. First such existing authentication method uses a combination of username and password. This method is weak and difficult to use due to manual interaction required for authentication which is difficult to implement in case of IoT devices since generally these involve large number of devices trying to access network.

Another existing authentication method uses one time password (OTP), for example, SMS-based OTP which achieves security through obscurity. Although the method leans towards stronger authentication, it assumes that the cellular network is secure. The devices cannot securely store password on itself. So some networks use SMS system, where the device creates a password on the network and the network sends that password to that device via SMS and lets the device log in with that password, and then it is considered authenticated, which has a validity period for that log in session after which it expires. This assumes that the cellular network is secure. Unfortunately, the 2G GSM is known not to be secure due to its vulnerability to different types of attack, for example, user impersonation or network impersonation by using a fake cell tower. With respect to 3G and 4G, such networks may use a rogue femtocell which may function as a miniature cell tower and use the cellular frequency where the backhaul is a cell phone. But it opened the floodgate of fake cell towers as the cell phone does not know whether it is the real cell tower or not and resulted in the hackers attacking the cell phones using these femtocells. Another drawback of using this system is that sending SMS is expensive and slow.

Yet another existing authentication method uses Public Key Infrastructure (PKI). Although this method provides strong authentication, it requires a PKI certificate which must be unique per device but the Certificate Authority (CA) signed certificate is expensive. Certificate validation uses a lot of Over The Air (OTA) time and not validating certificate makes the certificate worthless.

To overcome the issues described above with existing authentication methods, an authentication method that uses secure token and may be classified as a strong authentication method by third party standards, e.g. federal standards, may be used for authenticating devices on cellular networks. The embodiments recited here describe such method and system that use secure token for authenticating devices on cellular network.

To describe the features of the present invention in more detail within the context of products such as SIMs or SE/SIMs installed in the IoT devices, for example, vehicles, refer to the accompanying figures in conjunction with the following discussions. These examples are used for purpose of illustration only, and should not be construed as limitations.

The embodiments described herein disclose a computer-implemented method and system for secure authentication of devices for Internet of Things. The authentication method uses a secure token or a session key for authenticating devices on cellular network.

The method for secure authentication of IoT devices comprises establishing a network connection with a network operator server via a control channel, establishing identity of the network operator server using a pre-shared server key, establishing identity of the IoT device using a pre-shared client key and cryptographically generating a session key for a network session to allow data exchange between the network operator server and the IoT device. The pre-shared server key and the pre-shared client key may be same or different.

The system for secure authentication of IoT devices comprises a secure element for establishing a network connection with a network operator server via a control channel, wherein the secure element establishes identity of the network operator server using a pre-shared server key, and identity of the IoT device using a pre-shared client key; and a session key generator for cryptographically generating a session key for a network session to allow data exchange between the network operator server and the IoT device cryptographically generating a session key for a network session to allow data exchange between the network operator server and the IoT device. The pre-shared server key and the pre-shared client key may be same or different.

In an embodiment, a computer program product for secure authentication of IoT devices is also disclosed. The computer program product stored on a non-transferable computer readable medium for secure authentication of IoT devices, comprising computer readable instructions for causing a computer to control an execution of an application for secure authentication of IoT devices comprising establishing a network connection with a network operator server via a control channel, establishing identity of the network operator server using a pre-shared server key, establishing identity of the IoT device using a pre-shared client key and cryptographically generating a session key for a network session to allow data exchange between the network operator server and the IoT device. The pre-shared server key and the pre-shared client key may be same or different.

In an embodiment, the cryptographically generated session key is used for securely authenticating application running on the authenticated IoT device.

In an embodiment the generated session key comprises a pair of session keys where one session key is for the network operator server and the other session key is for the IoT device.

In yet another embodiment, the identity of the network operator server is established using one of the one or more pre-shared server keys and the identity of the IoT device is established using one of the one or more pre-shared client keys.

FIG. 1A illustrates a process of mutually authenticating an IoT device 102 containing a SIM 104 and an application 106 and a network provider server 112 in accordance with an embodiment of the present invention. The present invention uses a secret key or a pre-shared key for secure mutual authentication where an IoT device 102 and a network operator server 112 establish their respective identities to each other by using the secret key or a pre-shared key before communicating sensitive information with the network operator 112. This pre-shared key is distributed between the network provider server which may be a central authority and the IoT devices. This pre-shared key is stored securely in the SIM card, when the device is provisioned with the SIM card, that key is securely distributed to the device via that SIM card. The pre-shared server key and the pre-shared client key may be same or different. The secret key or the pre-shared key allows mutual authentication of the device 102 and the network operator server 112 where the device 102 proves that it has the ownership of that SIM card 104 without the device 102 knowing the pre-shared secret key. In this case, knowing just the network SMS key is not enough as you need to have access to the secret key and anyone with the mere access to the network cannot control the device. Since the present invention requires mutual authentication, the device 102 as well as the network operator server 112 both have to be authenticated using a pre-shared secret key. When the device 102 containing the SIM card 104 logs into the network operator server 112, the device 102 has to prove that it is a trusted device. The algorithm to do so is built upon a pre-shared master key between the SIM card 102 and the network operator server 112 which may be encrypted.

The IoT device 102 containing the SIM card 104 first establishes a connection to the network operator server 112 via control channel 118. Once the connection is established, the network operator server 112 asks the device 102 to prove that the device 102 has the SIM card 104 with the encrypted secret key 108. This secret key 108 is matched with the pre-shared encrypted master key 114 on the network operator server 112, thereby authenticating both the device 102 as well as the server 112. Once the device 102 containing the SIM card 104 and the network operator server 112 are authenticated, the device 102 is connected to the network 112. However, applications 106 running on that device 102 are not authenticated yet and need to be authenticated further to permit access to the network 112. Once the device 102 containing the SIM card 104 is logged in and authenticated, then applications 106 running on the device 102 have to log in to the network 112 to send the data to the network 112 by establishing a data channel 122. The present invention further discloses secure authentication of an application 106 running on the authenticated device 102 by using the network credentials that have already been created, for example, during network attachment, between the authenticated network operator 112 and the authenticated device 102.

For example, where a network provider provides both: network connectivity and application service to the device, once the device 102 is authenticated to connect to the network 112 through the SIM card 104 via secure data channel 124, a pair of network session keys 110 and 116 are created cryptographically for that network session 120, one for the SIM card 104 and one for the network operator 112. The network session key 110 thus created also known as secure token which may also be securely stored inside the SIM card 104 and its complementary network session key 116 is stored on the network operator server 112. Although these network session keys 110 and 116 are different and the device 102 as well as the server 112 do not know each other's network session keys, they form a pair when put together.

When the device 102 tries to log in to the application 106, instead of asking the device 102 to provide a separate password for the application 106, the network 112 asks the device 102 to prove that the device 102 has the authenticated SIM card 104. The device 102 does so by providing the network session key or secure token 110 created for that network session 120 which is then checked against the network session key 116 for that network session 120 on the network 112. Once the device 102 proves that it has that authenticated SIM card 102 via secure token 110 then the device 102 is authenticated to use both the network connection 122 as well as the applications running on that network 112 and the device 102 using an application session keys 106 and 118 created for the device 102 and network operator server 112 respectively for that application session. The application session keys have limited use for that application session.

This new Message Queue Telemetry Transport (MQTT) authentication procedure between a TCU and a MQTT server may use Generic Bootstrapping Architecture (GBA) for bootstrapping keys from cellular network credentials for application-level mutual authentication. Since an IP data session can only be initiated after a device (UE) has successfully attached to the network, the same keys established by the network and the AKA algorithm during network attachment may be used to provide mutual authentication between an IP application on a UE and a server trusted by the network.

In an embodiment, the MQTT Connect message is modified to add a payload to avoid using the publish/subscribe message pattern, since MQTT is not a request/reply protocol. This approach not only minimizes protocol overhead but also prevents potential DoS attack on publish/subscribe topics. The Universal Mobile Telecommunications System (UMTS) Authentication and Key Agreement Protocol (AKA) may be used by a LTE network to authenticate a LTE device (i.e. User Equipment (UE)) and to create session keys to secure communication between the device and the network. Mutual authentication in LTE may be based on the fact the Universal Subscriber Identity Module (USIM) card on a LTE device shares a master secrete, K, with the home network when that USIM card is provisioned (i.e. when a Home Subscriber Server (HSS) record is created). During attachment of the device (UE) to the LTE network, the network and the device may use AKA to authenticate each other and derive session keys Ks from the shared master secrete key K.

Figure 2A:
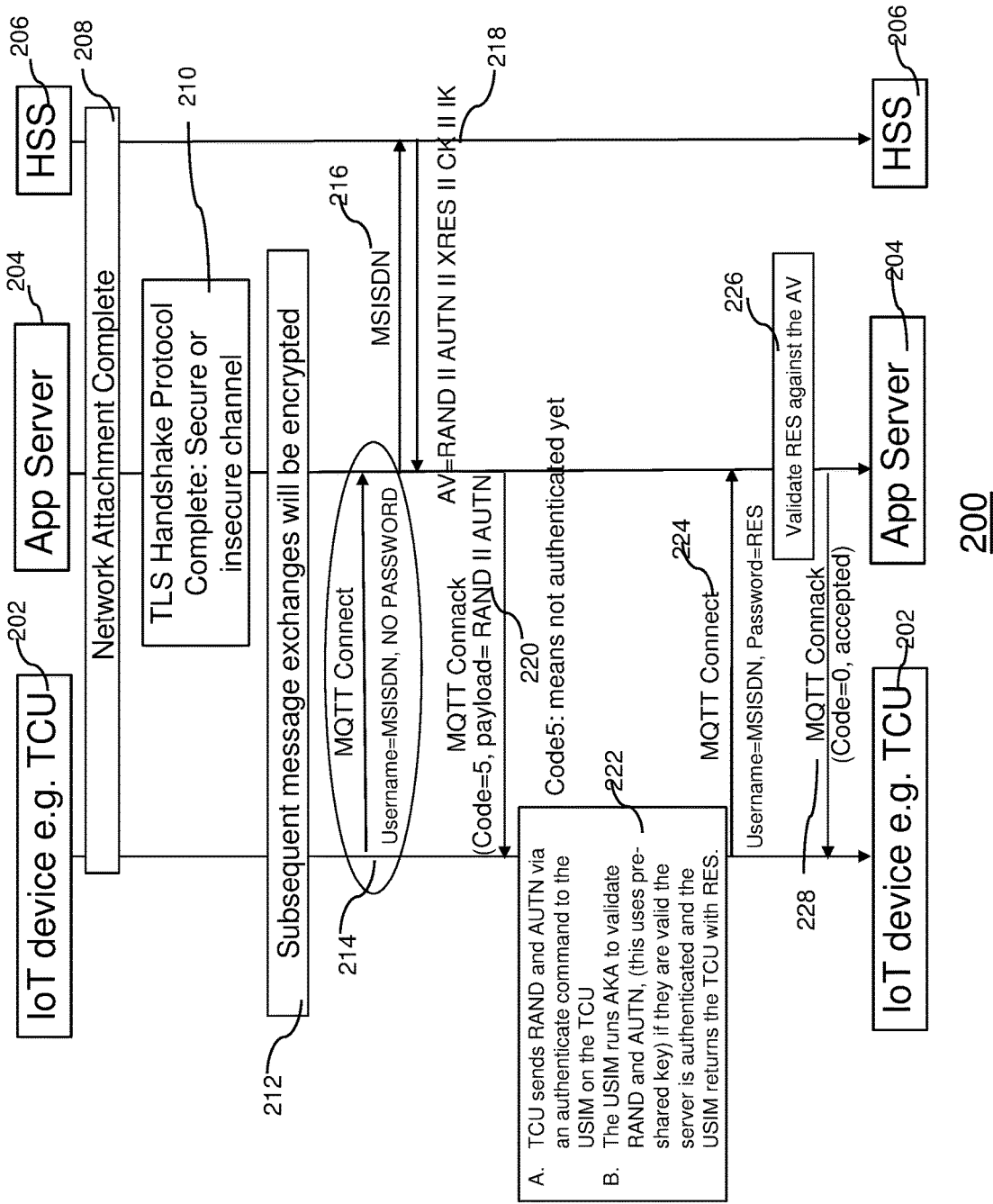
Figure 3A:
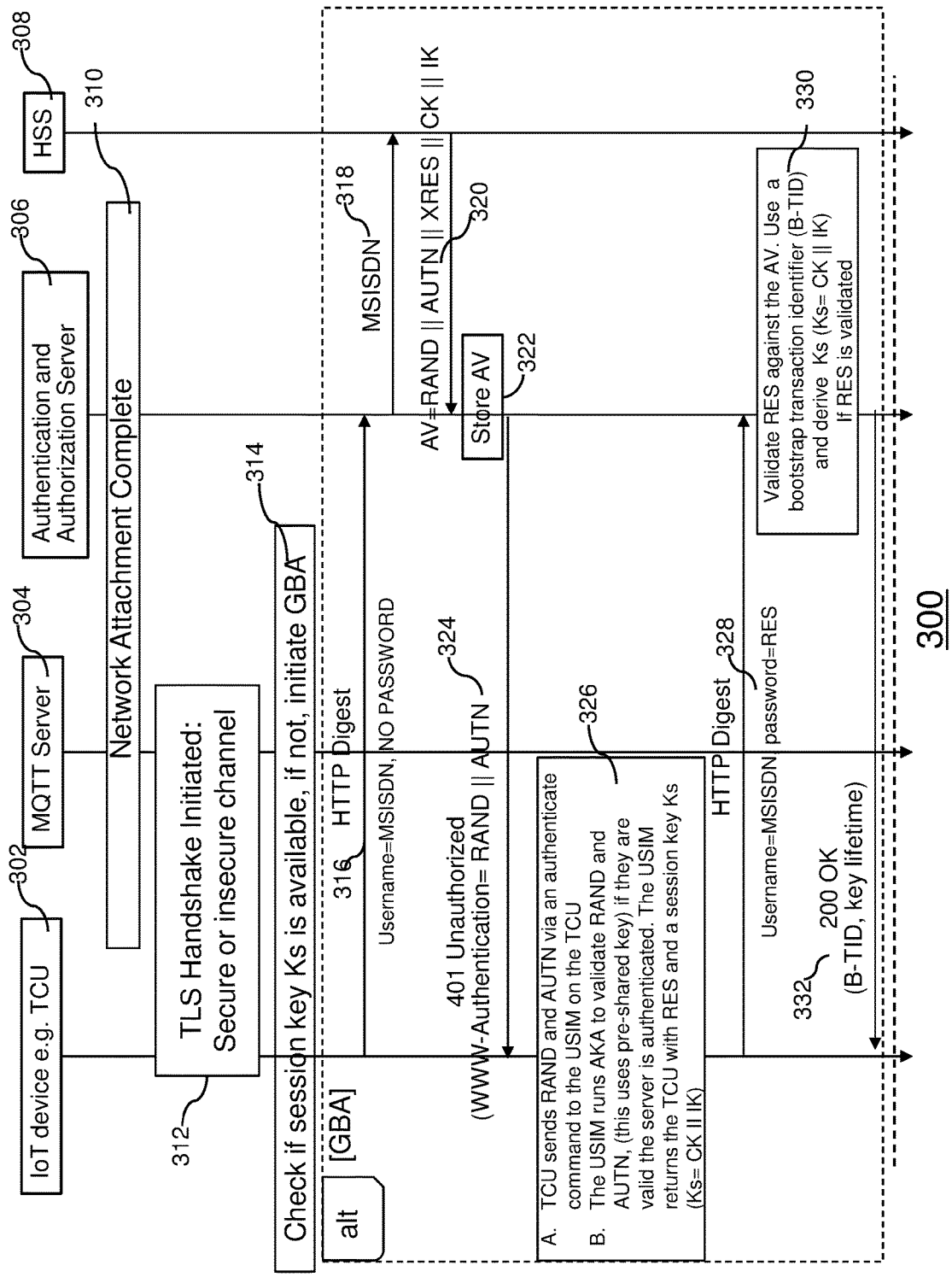

The GBA can be made to work with MQTT in two ways, either on top of Transport Layer Security (TLS) as illustrated in FIG. 2A or integrated with TLS (called Pre-shared Key-Transport Layer Security (PSK-TLS)) as illustrated in FIGS. 3A and 3B. Both embodiments are described in detail in the description accompanying FIGS. 2A, 3A and 3B.

In an embodiment, as will be discussed in the description accompanying FIG. 2A, for example, the following security credentials may be established and stored in the network and on the USIM after a network attachment procedure and a TLS handshake protocol is completed as follows. The network attachment procedure uses the pre-shared key to authenticate the device seeking network attachment.

For example, where the IoT device is a TCU of a vehicle, during MATT connection protocol where the device connects to the application server, the device send the username, for example, MSISDN, to the application server. The application server checks the MSISDN received against MSISDN on HSS. HSS returns the authentication vector (AV) which is a combination of RAND||AUTN||XRES||CK||IK to the application server (where RAND is a Random Number, AUTN is an Authentication Token, CK is a Cipher Key and IK is an Integrity Key). The RAND, AUTN, CK and IK are derived during the network attachment procedure. The random 128-bit number (RAND) is generated by Authentication center (AuC) on HSS and the encryption key (CK) is generated on USIM (Universal Subscriber Identity Module). XRES (Expected Response) is derived by a one-way function from the secret key K, RAND and Sequence number ($SQN_{AuC}$) on HSS and another encryption key (IK) is generated for USIM. Where CK is a session key that is also derived by a one way function from K, RAND and $SQN_{AuC}$ and IK is another session key derived similarly. AUTN which is an authentication token containing $SQN_{AuC}$ in encrypted form, an administrative field also known as authentication management field (AMF) which is an input parameter of the AKA' authentication algorithms, and a message authentication code (MAC) that protects the integrity of the authentication vector (AV) is generated on HSS. MATT connect acknowledgement is sent to the device by the application server with code 5, which means that the device is not authenticated yet, along with payload RAND H AUTN.

TCU then sends RAND and AUTN via an authenticate command to the USIM on the TCU. The USIM runs Authentication and Key Agreement (AKA) to validate RAND and AUTN, (which are generated using pre-shared key during network attachment) if they are valid the server is authenticated and the USIM returns the TCU with a Response (RES) which is a network session key derived during network attachment. This RES is then used as a password during MATT connect with MSISDN as a username. The Application server validated this RES against the stored AV, if it matches, a connection acknowledgement (MATT Connack) is sent back as Code=0, or accepted, which means that the device is now authenticated. Once authenticated, the IoT device, for example, a TCU may then communicate with the application server via secure data channel.

In another embodiment, as will be discussed in the description accompanying FIGS. 3A and 3B, for example, the following security credentials may be established and stored in the network and on the USIM after a network attachment procedure is completed and a TLS handshake protocol is initiated by checking if the application session key Ks is available. If the application session key Ks is not available, a generic bootstrapping algorithm may be initiated. For example, where the IoT device is a TCU of a vehicle, the device send the username, for example, MSISDN, to authentication and authorization server as a HTTP digest authentication request. The authentication and authorization server checks the MSISDN received against MSISDN on HSS. HSS returns the authentication vector (AV) which is a combination of RAND||AUTN||XRES||CK||IK to the authentication and authorization server, which stores it.

A random 128-bit number (RAND) is generated by Authentication center (AuC) on HSS and an encryption key (CK) is generated on USIM. XRES is derived by a one-way function from the secret key K, RAND and Sequence number ($SQN_{AuC}$) on HSS and another encryption key (IK) is generated for USIM. Where CK is a session key that is also derived by a one way function from K, RAND and $SQN_{AuC}$ and IK is another session key derived similarly. AUTN which is an authentication token containing $SQN_{AuC}$ in encrypted form, an administrative field also known as authentication management field (AMF) and a message authentication code (MAC) that protects the integrity of the authentication vector (AV) is generated on HSS. A 401 message for unauthorized request is sent to the device by the authentication and authorization server (A2) 306 along with WWW-Authentication=RAND||AUTN.

For example, where the IoT device is a TCU of a vehicle, the TCU sends RAND and AUTN via an authenticate command to the USIM on the TCU. The USIM runs AKA to validate RAND and AUTN, which are generated using pre-shared key during network attachment. If they are valid, the server is authenticated and the USIM returns the TCU with RES and a session key Ks (Ks=CK||IK). This RES is then used as a password during HTTP Digest authentication with MSISDN as username. The authentication and authorization server validates this RES against the stored AV, if it matches, uses a life time identifier also known as a bootstrap transaction identifier (B-TID) and derive application session key Ks (Ks=CK∥IK). B-TID is a lifetime identifier or a long term key where TID is a transaction identifier and may be predetermined, preselected and/or preassigned. Client key exchange (3gpp-gba, B-TID) is matched with MATT server and Authentication and authorization server identifier B-TID and generated application session key Ks. TLS Hand shake is complete and both sides now share the same key Ks which TLS will use to encrypt subsequent messages. The IoT device, for example, a TCU connects with the application server (MATT server) using username B-TID which does not require any password. A connection acknowledgement is sent back as Code=0, or accepted, which means the device and the network operator server are now authenticated. The IoT device, for example, a TCU may then communicate with the application (MATT) server via secure data channel.

In an embodiment, illustrated by FIG. 1B, the identity of the network operator server is established using one of the one or more pre-shared server keys and the identity of the IoT device is established using one of the one or more pre-shared client keys.

FIG. 1B illustrates a system and process 100' of mutually authenticating an IoT device 102 containing a SE/SIM (SIM as a secure element) 104 and an application 106 and a network provider server 112 in accordance with an embodiment of the present invention. The present invention uses a secret key or a pre-shared key for secure mutual authentication where an IoT device 102 and a network operator server 112 establish their respective identities to each other by using one or more pre-shared keys or secret keys 108' before communicating sensitive information with the network operator 112.

These pre-shared keys 108' are distributed between the network provider server which may be a central authority and the IoT devices. These pre-shared keys 108' are stored securely in the SE/SIM card, when the device is provisioned with the SIM card, those keys are securely distributed to the device via that SE/SIM card. The pre-shared server keys and the pre-shared client keys may be same or different. The secret keys or the pre-shared keys allow mutual authentication of the device 102 and the network operator server 112 where the device 102 proves that it has the ownership of that SE/SIM card 104 without the device 102 knowing the pre-shared secret key.

In this case, knowing just the network SMS key is not enough as you need to have access to the secret key and anyone with the mere access to the network cannot control the device. Since the present invention requires mutual authentication, the device 102 as well as the network operator server 112 both have to be authenticated using one of one or more pre-shared secret keys. When the device 102 containing the SIM card 104 logs into the network operator server 112, the device 102 has to prove that it is a trusted device. The algorithm to do so is built upon a pre-shared master key between the SIM card 102 and the network operator server 112 which may be encrypted.

The IoT device 102 containing the SE/SIM card 104 first establishes a connection to the network operator server 112 via control channel 118. Once the connection is established, the network operator server 112 asks the device 102 to prove that the device 102 has the SE/SIM card 104 with the encrypted secret key 108. This secret key 108' is matched with one of the one or more pre-shared encrypted master keys 114' on the network operator server 112, thereby authenticating both the device 102 as well as the server 112. Once the device 102 containing the SE/SIM card 104 and the network operator server 112 are authenticated, the device 102 is connected to the network 112.

However, applications 106 running on that device 102 are not authenticated yet and need to be authenticated further to permit access to the network 112. Once the device 102 containing the SE/SIM card 104 is logged in and authenticated, then applications 106 running on the device 102 have to log in to the network 112 to send the data to the network 112 by establishing a data channel 122. The present invention further discloses secure authentication of an application 106 running on the authenticated device 102 by using the network credentials that have already been created, for example, during network attachment, between the authenticated network operator 112 and the authenticated device 102.

For example, where a network provider provides both: network connectivity and application service to the device, once the device 102 is authenticated to connect to the network 112 through the SE/SIM card 104 via secure data channel 124, a pair of network session keys 110 and 116 are created cryptographically for that network session 120, one for the SE/SIM card 104 and one for the network operator 112. The network session key 110 thus created also known as secure token which may also be securely stored inside the SE/SIM card 104 and its complementary network session key 116 is stored on the network operator server 112. Although these network session keys 110 and 116 are different and the device 102 as well as the server 112 do not know each other's network session keys, they form a pair when put together.

When the device 102 tries to log in to the application 106, instead of asking the device 102 to provide a separate password for the application 106, the network 112 asks the device 102 to prove that the device 102 has the authenticated SIM card 104. The device 102 does so by providing the network session key or secure token 110 created for that network session 120 which is then checked against the network session key 116 for that network session 120 on the network 112. Once the device 102 proves that it has that authenticated SIM card 102 via secure token 110 then the device 102 is authenticated to use both the network connection 122 as well as the applications running on that network 112 and the device 102 using an application session keys 106 and 118 created for the device 102 and network operator server 112 respectively for that application session. The application session keys have limited use for that application session.

This new Message Queue Telemetry Transport (MQTT) authentication procedure between a TCU and a MQTT server may use Generic Bootstrapping Architecture (GBA) for bootstrapping keys from cellular network credentials for application-level mutual authentication. Since an IP data session can only be initiated after a device (UE) has successfully attached to the network, the same keys established by the network and the AKA algorithm during network attachment may be used to provide mutual authentication between an IP application on a UE and a server trusted by the network.

In an embodiment, the MQTT Connect message is modified to add a payload to avoid using the publish/subscribe message pattern, since MQTT is not a request/reply protocol. This approach not only minimizes protocol overhead but also prevents potential DoS attack on publish/subscribe topics. The Universal Mobile Telecommunications System (UMTS) Authentication and Key Agreement Protocol (AKA) may be used by a LTE network to authenticate a LTE device (i.e. User Equipment (UE)) and to create session keys to secure communication between the device and the network. Mutual authentication in LTE may be based on the fact the SE/SIM card on a LTE device shares a master secret, K, with the home network when that SE/SIM card is provisioned (i.e. when a Home Subscriber Server (HSS) record is created). During attachment of the device (UE) to the LTE network, the network and the device may use AKA to authenticate each other and derive session keys Ks from the shared master secrete key K.

Figure 4A:
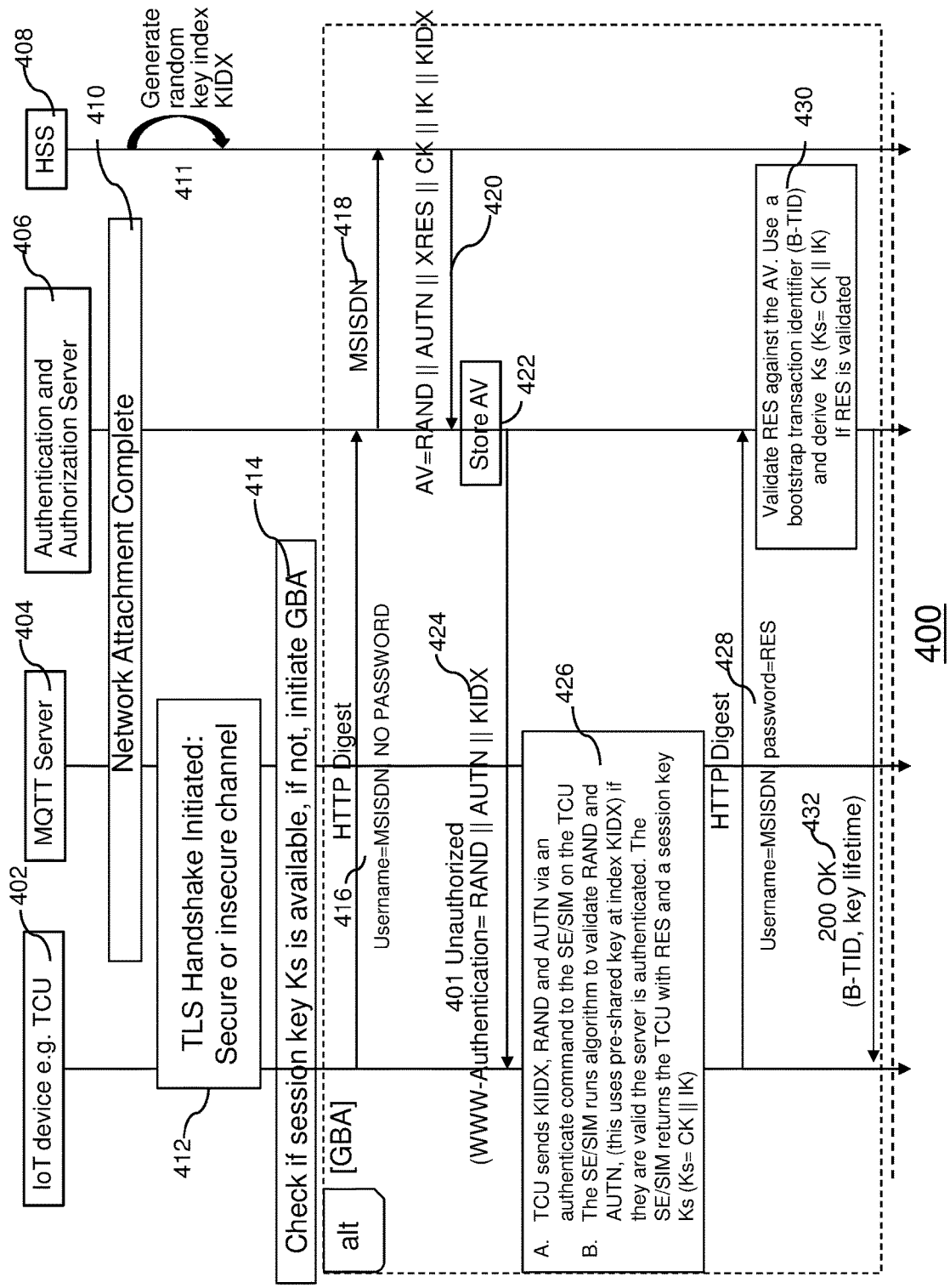

The GBA can be made to work with MQTT in two ways, either on top of Transport Layer Security (TLS) as illustrated in FIG. 2B or integrated with TLS (called Pre-shared Key-Transport Layer Security (PSK-TLS)) as illustrated in FIGS. 4A and 4B. Both embodiments are described in detail in the description accompanying FIGS. 2B, 4A and 4B.

In an embodiment, as will be discussed in the description accompanying FIG. 2B, for example, the following security credentials may be established and stored in the network and on the SE/SIM after a network attachment procedure and a TLS handshake protocol is completed as follows. The network attachment procedure uses the pre-shared key to authenticate the device seeking network attachment. HSS generates a random key index KIDX via step 211 and uses the key at that index during the network attachment procedure.

For example, where the IoT device is a TCU of a vehicle, during MATT connection protocol where the device connects to the application server, the device send the username, for example, MSISDN, to the application server. The application server checks the MSISDN received against MSISDN on HSS. HSS returns the authentication vector (AV) which is a combination of RAND∥AUTN XRES∥CK∥IK∥KIDX to the application server (where RAND is a Random Number, AUTN is an Authentication Token, CK is a Cipher Key and IK is an Integrity Key and KIDX is a random key index that was generated and used during the network attachment procedure). The RAND, AUTN, CK, IK and KIDX are derived during the network attachment procedure.

The random 128-bit number (RAND) is generated by Authentication center (AuC) on HSS and the encryption key (CK) is generated on SE/SIM (Secure Element/Subscriber Identity Module). XRES (Expected Response) is derived by a one-way function from the secret key K, RAND and Sequence number ($SQN_{AuC}$) on HSS and another encryption key (IK) is generated for SE/SIM. Where CK is a session key that is also derived by a one-way function from K, RAND and $SQN_{AuC}$ and IK is another session key derived similarly. AUTN which is an authentication token containing $SQN_{AuC}$ in encrypted form, an administrative field also known as authentication management field (AMF) which is an input parameter of the AKA' authentication algorithms, and a message authentication code (MAC) that protects the integrity of the authentication vector (AV) is generated on HSS. MATT connect acknowledgement is sent to the device by the application server with code 5, which means that the device is not authenticated yet, along with payload RAND∥AUTN∥KIDX.

TCU then sends RAND, AUTN and KIDX via an authenticate command to the SE/SIM on the TCU. The SE/SIM runs an algorithm Authentication and Key Agreement (AKA) to validate RAND and AUTN, (which are generated using pre-shared key during network attachment) using pre-shared key at index KIDX, if they are valid the server is authenticated and the SE/SIM returns the TCU with a Response (RES) which is a network session key derived during network attachment. This RES is then used as a password during MATT connect with MSISDN as a username. The Application server validated this RES against the stored AV, if it matches, a connection acknowledgement (MATT Connack) is sent back as Code=0, or accepted, which means that the device is now authenticated. Once authenticated, the IoT device, for example, a TCU may then communicate with the application server via secure data channel.

In another embodiment, as will be discussed in the description accompanying FIGS. 4A and 4B, for example, the following security credentials may be established and stored in the network and on the SE/SIM after a network attachment procedure is completed and a TLS handshake protocol is initiated by checking if the application session key Ks is available. If the application session key Ks is not available, a generic bootstrapping algorithm may be initiated. For example, where the IoT device is a TCU of a vehicle, the device sends the username, for example, MSISDN, to authentication and authorization server as a HTTP digest authentication request. The authentication and authorization server checks the MSISDN received against MSISDN on HSS. HSS returns the authentication vector (AV) which is a combination of RAND∥AUTN∥XRES∥CK∥IK∥KIDX to the authentication and authorization server, which stores it.

A random 128-bit number (RAND) is generated by Authentication center (AuC) on HSS and an encryption key (CK) is generated on SE/SIM. XRES is derived by a one-way function from the secret key K, RAND and Sequence number ($SQN_{AuC}$) on HSS and another encryption key (IK) is generated for SE/SIM. Where CK is a session key that is also derived by a one way function from K, RAND and $SQN_{AuC}$ and IK is another session key derived similarly. AUTN which is an authentication token containing $SQN_{AuC}$ in encrypted form, an administrative field also known as authentication management field (AMF) and a message authentication code (MAC) that protects the integrity of the authentication vector (AV) is generated on HSS. A 401 message for unauthorized request is sent to the device by the authentication and authorization server (A2) 406 along with WWW-Authentication=RAND∥AUTN∥KIDX.

For example, where the IoT device is a TCU of a vehicle, the TCU sends RAND and AUTN via an authenticate command to the SE/SIM on the TCU. The SE/SIM runs AKA to validate RAND and AUTN, which uses pre-shared key at index KIDX generated during network attachment. If they are valid, the server is authenticated and the SE/SIM returns the TCU with RES and a session key Ks (Ks=CK∥IK). This RES is then used as a password during HTTP Digest authentication with MSISDN as username. The authentication and authorization server validates this RES against the stored AV, if it matches, uses a life time identifier also known as a bootstrap transaction identifier (B-TID) and derive application session key Ks (Ks=CK∥IK). B-TID is a lifetime identifier or a long-term key where TID is a transaction identifier and may be predetermined, preselected and/or preassigned.

Client key exchange (3gpp-gba, B-TID) is matched with MATT server and Authentication and authorization server identifier B-TID and generated application session key Ks. TLS Hand shake is complete and both sides now share the same key Ks which TLS will use to encrypt subsequent messages. The IoT device, for example, a TCU connects with the application server (MATT server) using username B-TID which does not require any password. A connection acknowledgement is sent back as Code=0, or accepted, which means the device and the network operator server are now authenticated. The IoT device, for example, a TCU may then communicate with the application (MATT) server via secure data channel.

Although LTE is used to explain the working of the present invention in one or more embodiments described above, the same procedure may also work on High-Speed Downlink Packet Access (HSDPA)/Edge/GSM networks and CDMA networks.

Thus, the claimed invention provides many benefits including a strong secure identity with very low per device add-on cost. The benefits also include low cost, high speed, compatible with different types of networking systems and complaint to regulations around the world. The method and system uses a session key securely stored on the SIM card as a secure token for device-to-server mutual authentication, leverages established SIM management and does not require Certification Authority (CA) signed certificate, thereby saving cost of CA signed certificate. It is fast as there is no out-of-band SMS, authentication takes place in-band at the beginning of an Internet Protocol (IP) session. It is compatible with Long-Term Evolution/Universal Mobile Telecommunications System/Global System for Mobile Communications (LTE/UMTS/GSM) and Code Division Multiple Access (CDMA) as well as with wireless local area network (WLAN/Wi-Fi)-Cellular internetworking and it is open as it is built on 3rd Generation Partnership Project (3GPP)/3GPP2 GBA Standards. It is also compliant with industry vetted standards compliant to regulations around the world.

FIGS. 2A and 2B illustrate exemplary systems 200 and 200' and methods using machine-to-machine (M2M)/"Internet of Things" (IoT) connectivity protocol (MQTT) client authorization in accordance with one or more embodiments of the present invention.

FIG. 2A illustrates an exemplary system 200 and method using machine-to-machine (M2M)/"Internet of Things" (IoT) connectivity protocol (e.g., MQTT) client authorization in accordance with an embodiment of the present invention. The system 200 includes an IoT device, for example, a Telematics Control Unit (TCU) 202, an Application Server of a Telematics Service Provider TSP (or MATT) 204 and home subscriber server (HSS) 206. The TCU 202 will establish an encrypted TLS channel with the Application server of TSP 204 first before the GBA procedure starts, and proceeds with a TLS Handshake Protocol which may be on a secure or unsecure channel via step 210. For example, via sub steps 1-9 (not shown in FIG. 2) as shown below:
TCU→MQTT: step 1. Client_Hello
MQTT→TCU: step 2. Server_Hello
MQTT→TCU: step 3. Server_Key_Exchange\n(Server Certificate)
MQTT→TCU: step 4. Server_Hello_Done
TCU→MQTT: step 5. Client_Key_Exchange
TCU→MQTT: step 6. Change_Cipher_Spec
TCU→MQTT: step 7. Finished
MQTT→TCU: step 8. Change_Cipher_Spec
MQTT→TCU: step 9. Finished
  where MQTT may be an Application server of TSP 204.

It then proceeds to create a secure network session where subsequent message exchanges are encrypted via step 212. In this embodiment, the MQTT Connect message is modified to add a payload to avoid using the publish/subscribe message pattern, since MQTT is not a request/reply protocol. This approach not only minimizes protocol overhead but also prevents potential DoS attack on publish/subscribe topics. The Universal Mobile Telecommunications System (UMTS) Authentication and Key Agreement Protocol (AKA) may be used by a LTE network to authenticate a LTE device (i.e. User Equipment (UE)) and to create session keys to secure communication between the device and the network. Mutual authentication in LTE may be based on the fact the Universal Subscriber Identity Module (USIM) card on a LTE device shares a master secrete, K, with the home network when that USIM card is provisioned (i.e. when a Home Subscriber Server (HSS) record is created). During attachment of the device (UE) to the LTE network, the network and the device may use AKA to authenticate each other and derive application session keys Ks from the shared master secrete key K.

The following security credentials may be established and stored in the network and on the USIM after a network attachment procedure and a TLS handshake protocol is completed as follows.

For example, where the IoT device is a TCU of a vehicle, during MATT connection protocol where the device connects to the application server, the device send the username, for example, MSISDN, to the application server via step 214. The application server checks the MSISDN received against MSISDN on HSS via step 216. HSS returns the authentication vector (AV) which is a combination of RAND∥AUTN∥XRES∥CK∥IK to the application server via step 218. A random 128-bit number (RAND) is generated by Authentication center (AuC) on HSS and an encryption key (CK) is generated on USIM. XRES is derived by a one-way function from the secret key K, RAND and Sequence number ($SQN_{AuC}$) on HSS and another encryption key (IK) is generated for USIM. Where CK is a session key that is also derived by a one way function from K, RAND and $SQN_{AuC}$ and IK is another session key derived similarly. AUTN: an authentication token containing $SQN_{AuC}$ in encrypted form, an administrative field also known as authentication management field (AMF) and a message authentication code (MAC) that protects the integrity of the authentication vector (AV) is generated on HSS, as illustrated in FIG. 2 and as shown below.
TCU→MQTT: step 214. MQTT Connect\n (username=MSISDN, no password)
MATT-→HSS: step 216. MSISDN
HSS→MQTT: step 218. AV=RAND∥AUTN∥XRES∥CK∥IK (generated during network attachment)

The App server 204, for example, MOTT, at this point Stores AV as requested and proceeds to the next step 220. MATT connect acknowledgement is sent to the device by the application server via step 220 with code 5, which means that the device is not authenticated yet, along with payload RAND∥AUTN, as illustrated in FIG. 2 and as shown below.
MQTT→TCU: step 220. MQTT Connack\n(code=5, payload=RAND∥AUTN)

TCU 202 then sends RAND and AUTN via an authenticate command to the USIM on the TCU 202. The USIM runs AKA to validate RAND and AUTN, which are generated using pre-shared keys during network attachment. If they are valid, the server is authenticated and the USIM returns the TCU with RES via step 222. This RES is then used as a password during MATT connect with MSISDN as a username via step 224. The Application server validates this RES against the stored AV via step 226, if it matches, a connection acknowledgement (MATT Connack) is sent back as Code=0, or accepted via step 228, which means that the device is now authenticated, as illustrated in FIG. 2 and shown below.
TCU→MQTT: step 224. MQTT Connect\n (username=MSISDN, password=RES)
MATT→TCU: step 228. MATT Connack\n(code=0, accepted)

Once authenticated, the IoT device 202, for example, TCU, may then communicate with the application server via secure data channel.

FIG. 2B illustrates an exemplary system 200' and method using machine-to-machine (M2M)/"Internet of Things" (IoT) connectivity protocol (e.g., MATT) client authorization in accordance with an embodiment of the present invention. For example, in an embodiment, the identity of the network operator server may be established using one of one or more pre-shared server keys and the identity of the IoT device may be established using one of one or more pre-shared client keys.

For example, similar to FIG. 2A, where the IoT device is a TCU of a vehicle, during MQTT connection protocol where the device connects to the application server, the device sends the username, for example, MSISDN, to the application server via step 214. The application server checks the MSISDN received against MSISDN on HSS via step 216.

As illustrated in FIG. 2B, HSS 206 returns the authentication vector (AV) which is a combination of RAND||AUTN||XRES||CK||IK||KIDX to the application server via step 218'. A random 128-bit number (RAND) is generated by Authentication center (AuC) on HSS and an encryption key (CK) is generated on SE/SIM. XRES is derived by a one-way function from the secret key K, RAND and Sequence number ($SQN_{AuC}$) on HSS and another encryption key (IK) is generated for SE/SIM. Where CK is a session key that is also derived by a one-way function from K, RAND and $SQN_{AuC}$ and IK is another session key derived similarly. AUTN: an authentication token containing $SQN_{AuC}$ in encrypted form, an administrative field also known as authentication management field (AMF) and a message authentication code (MAC) that protects the integrity of the authentication vector (AV) is generated on HSS 206, as illustrated in FIG. 2B and as shown below.

TCU→MQTT: step 214. MQTT Connect\n (username=MSISDN, no password)
MATT→HSS: step 216. MSISDN
HSS→MQTT: step 218'. AV=RAND||AUTN||XRES||CK||IK||KIDX (generated during network attachment)

The App server 204, for example, MATT, at this point Stores AV as requested and proceeds to the next step 220'. MQTT connect acknowledgement is sent to the device by the application server via step 220' with code 5, which means that the device is not authenticated yet, along with payload RAND||AUTN||KIDX, as illustrated in FIG. 2B and as shown below.

MQTT→TCU: step 220. MQTT Connack\n(code=5, payload=RAND||AUTN||KIDX)

TCU 202 then sends KIDX, RAND and AUTN via an authenticate command to the SE/SIM on the TCU 202. The SE/SIM runs AKA to validate RAND and AUTN, which uses pre-shared key at index KIDX during network attachment. If they are valid, the server is authenticated and the SE/SIM returns the TCU with RES via step 222'. This RES is then used as a password during MATT connect with MSISDN as a username via step 224. The Application server validates this RES against the stored AV via step 226, if it matches, a connection acknowledgement (MATT Connack) is sent back as Code=0, or accepted via step 228, which means that the device is now authenticated, as illustrated in FIG. 2B and shown below.

TCU→MQTT: step 224. MQTT Connect\n (username=MSISDN, password=RES)
MATT→TCU: step 228. MQTT Connack\n(code=0, accepted)

Once authenticated, the IoT device 202, for example, TCU, may then communicate with the application server via secure data channel.

Although LTE is used to explain the working of the present invention in one or more embodiments described above, the same procedure may also work on High-Speed Downlink Packet Access (HSDPA)/Edge/GSM networks and CDMA networks.

The method and system disclosed in FIGS. 2A and 2B have numerous advantages, for example, since it does not require SMS it is ten times faster on bootstrap because of no out-of-band (SMS) delay. In fact, the bootstrap procedure can be run as many times as required. Another major advantage is that each network attachment will give a TCU 202 a new "password" to login to the MATT or App server 204. No CA-signed certificate required. Additionally, mutual authentication may be accomplished by built-in network authentication. Therefore, a self-signed certificate is sufficient. It may also result in 50% reduction in OTA data consumption.

FIGS. 3A and 3B illustrate an exemplary system using Pre-shared Key-Transport Layer Security (PSK-TLS) in accordance with an embodiment of the present invention. GBA may be used to securely "bootstrap" a pre-shared key required by PSK-TLS. Once a UE and a network (HSS) has mutually authenticated each other, they will both have network "session" key material CK and IK generated during network attachment. TLS may use GBA directly to mutually authenticate communicating end points and then to derive TLS session keys for data encryption.

FIGS. 3A and 3B illustrate how the 3GPP standard may be leveraged for mutual authentication between an IoT device 302, for example, a TCU and an App server 304, for example, MATT. In an embodiment, for example, there may be four participants as shown in FIG. 3A, a TCU 302, an App server 304, authentication and authorization server 306, for example, A2, and HSS 308 attached to the Network via step 310. Once the network attachment is complete, it may proceed to the client-server handshake via step 312. For example, via sub steps 1-4 (not shown in FIG. 3A) as shown below:

TCU→MQTT: step 1. Client_Hello\n(PSK Ciphersuite)
MATT→TCU: step 2. Server_Hello(PSK Ciphersuite)
MATT→TCU: step 3. Server_Key_Exchange\n(PSK-Identity-Hint=3gpp-gba)
MATT→TCU: step 4. Server_Hello_Done The following security credentials may be established and stored in the network and on the USIM after a network attachment procedure is completed and a TLS handshake protocol is initiated. For example, where the IoT device is a TCU of a vehicle, the TLS handshake protocol is initiated by checking with TCU 302 if the network session key Ks is available. If the network session key Ks is not available, a generic bootstrapping algorithm may be initiated via step 314. For example, where the IoT device is a TCU of a vehicle, the device send the username, for example, MSISDN, to authentication and authorization server as a HTTP digest authentication request via step 316. The authentication and authorization server checks this MSISDN received against MSISDN on HSS via step 318. HSS returns the authentication vector (AV) which is a combination of RAND||AUTN||XRES||CK||IK, generated during network attachment procedure, to the authentication and authorization server via step 320, which stores it via step 322.

In step 320, a random 128-bit number (RAND) is generated by Authentication center (AuC) on HSS and an encryption key (CK) is generated on USIM. XRES is derived by a one-way function from the secret key K, RAND and Sequence number ($SQN_{AuC}$) on HSS and another encryption key (IK) is generated for USIM. Where CK is a session key that is also derived by a one way function from K, RAND and $SQN_{AuC}$ and IK is another session key derived similarly. AUTN: an authentication token containing $SQN_{AuC}$ in encrypted form, an administrative field also known as authentication management field (AMF) and a message authentication code (MAC) that protects the integrity of the authentication vector (AV) is generated on HSS. A 401 message for unauthorized request is sent to the device by the authentication and authorization server (A2) 306 along with WWW-Authentication=RAND H AUTN via step 324. The process is illustrated in FIG. 3A and is shown below:

alt GBA
TCU→A2: step 316. HTTP Digest\n(username=MSISDN, no password)
A2→HSS: step 318. MSISDN
HSS→A2: step 320. AV=RAND∥AUTN∥XRES∥CK∥IK The authentication and authorization server (A2) 306 is then asked to store AV via step 322.
A2→TCU: step 324. 401 Unauthorized\n(WWW-Authentication=RAND∥AUTN)

For example, where the IoT device 302 is a TCU of a vehicle, the TCU 302 sends RAND and AUTN via an authenticate command to the USIM on the TCU. The USIM runs AKA to validate RAND and AUTN, generated using a pre-shared key during network attachment procedure. If they are valid, the server is authenticated and the USIM returns the TCU with RES and a session key Ks (Ks=CK∥IK) via step 326. This RES is then used as a password during HTTP Digest authentication with MSISDN as username via step 328. The authentication and authorization server validates this RES against the stored AV, if it matches, uses a predetermined, preselected and/or preassigned bootstrap transaction identifier (B-TID) and derive Ks (Ks=CK∥IK) via step 330. B-TID is a lifetime identifier or a long term key where TID is a transaction identifier as shown in step 332. Client key exchange (3gpp-gba, B-TID) is matched with MATT server at step 334 and Authentication and authorization server identifier B-TID at step 336 and generated session key Ks at step 338 as illustrated in FIGS. 3A and 3B and shown below.

TCU→A2: step 328. HTTP Digest\n(username=MSISDN, password=RES)

A2 306 validate RES against the stored AV and uses a Bootstrap Transaction Identifier (B-TID) and derive Ks (Ks=CK∥IK) if RES is validated via step 330. The Bootstrap Transaction Identifier (B-TID) may be predetermined, preselected and/or preassigned.

A2→TCU: step 332. 200 OK\n(B-TID, key lifetime)
end alt
TCU→MQTT: step 334. Client_Key_Exchange\n(3gpp-gba, B-TID)
MQTT→A2: step 336. B-TID
A2→MQTT: step 338. Ks TLS hand-shake is completed via steps 340 through 346 as illustrated in FIG. 3B and as shown below:
TCU→MQTT: step 340. Change_Cipher_Spec
TCU→MQTT: step 342. Finished
MQTT→TCU: step 344. Change_Cipher_Spec
MQTT→TCU: step 346. Finished Both sides TCU 302 as well as app server (MATT) 304 now share the same key Ks which TLS will use to encrypt subsequent messages as shown in step 348. The IoT device, for example, a TCU connects with the application server (MQTT server) using username B-TID which does not require any password via step 350. A connection acknowledgement is sent back as Code=0, or accepted, which means the device and the network operator server are now authenticated via step 352 is illustrated in FIG. 3B and as shown below.

TCU→MQTT: step 350. MQTT Connect\n(username=B-TID, no password)
MQTT→TCU: step 352. MQTT Connack\n(code=0, accepted)

The IoT device 302, for example, a TCU may then communicate with the application (MQTT) server via secure data channel.

Although LTE is used to explain the working of the present invention, the same procedure may also work on High Speed Downlink Packet Access (HSDPA)/Edge/GSM networks and CDMA networks.

The method illustrated in FIGS. 3A and 3B has numerous advantages along with other advantages described earlier, as it does not require any certificate. Additionally, the process does not require encryption but is still resistant to man-in-the-middle attack. Also, the process does not require modification to MATT and results in considerable reduction in OTA data consumption because a TCU does not need to download a certificate over the air.

FIGS. 4A and 4B illustrate an exemplary system and method 400 using Pre-shared Key-Transport Layer Security (PSK-TLS) in accordance with an embodiment of the present invention. In an exemplary embodiment, illustrated by FIGS. 4A and 4B, the identity of the network operator server is established using one of one or more pre-shared server keys and the identity of the IoT device is established using one of one or more pre-shared client keys. GBA may be used to securely "bootstrap" a pre-shared key required by PSK-TLS. Once a UE and a network (HSS) has mutually authenticated each other, they will both have network "session" key material CK and IK generated during network attachment. TLS may use GBA directly to mutually authenticate communicating end points and then to derive TLS session keys for data encryption.

FIGS. 4A and 4B illustrate how the 3GPP standard may be leveraged for mutual authentication between an IoT device 302, for example, a TCU and an App server 404, for example, MATT. In an embodiment, for example, there may be four participants as shown in FIG. 4A, a TCU 402, an App server 404, authentication and authorization server 406, for example, A2, and HSS 408 attached to the Network via step 410. HSS generates a random key index KIDX via step 411 and uses the key at that index during the network attachment procedure. Once the network attachment is complete, it may proceed to the client-server handshake via step 412. For example, via sub steps 1-4 (not shown in FIG. 4A) as shown below:

TCU→MQTT: step 1. Client_Hello\n(PSK Ciphersuite)
MATT→TCU: step 2. Server_Hello(PSK Ciphersuite)
MATT→TCU: step 3. Server_Key_Exchange\n(PSK-Identity-Hint=3gpp-gba)
MATT→TCU: step 4. Server_Hello_Done The following security credentials may be established and stored in the network and on the SE/SIM after a network attachment procedure is completed and a TLS handshake protocol is initiated. For example, where the IoT device is a TCU of a vehicle, the TLS handshake protocol is initiated by checking with TCU 402 if the network session key Ks is available. If the network session key Ks is not available, a generic bootstrapping algorithm may be initiated via step 414. For example, where the IoT device is a TCU of a vehicle, the device sends the username, for example, MSISDN, to authentication and authorization server as a HTTP digest authentication request via step 416. The authentication and authorization server checks this MSISDN received against MSISDN on HSS via step 418. HSS returns the authentication vector (AV) which is a combination of RAND∥AUTN∥XRES∥CK∥IK∥KIDX, generated during network attachment procedure, to the authentication and authorization server via step 420, which stores it via step 422.

In step 420, a random 128-bit number (RAND) is generated by Authentication center (AuC) on HSS and an encryption key (CK) is generated on SE/SIM. XRES is derived by a one-way function from the secret key K, RAND and Sequence number ($SQN_{AuC}$) on HSS and another encryption key (IK) is generated for SE/SIM. Where CK is a session key that is also derived by a one-way function from K, RAND and $SQN_{AuC}$ and IK is another session key derived similarly. AUTN: an authentication token containing $SQN_{AuC}$ in encrypted form, an administrative field also known as authentication management field (AMF) and a message authentication code (MAC) that protects the integrity of the authentication vector (AV) is generated on HSS. A 401 message for unauthorized request is sent to the device by the authentication and authorization server (A2) 306 along with WWW-Authentication=RAND∥AUTN∥KIDX via step 424. The process is illustrated in FIG. 4A and is shown below:

alt GBA
TCU→A2: step 416. HTTP Digest\n(username=MSISDN, no password)
A2→HSS: step 418. MSISDN
HSS→A2: step 420. AV=RAND∥AUTN∥XRES∥CK∥IK∥KIDX (generated during network attachment procedure)

The authentication and authorization server (A2) 406 is then asked to store AV via step 422.
A2→TCU: step 424. 401 Unauthorized\n(WWW-Authentication=RAND∥AUTN∥KIDX)

For example, where the IoT device 402 is a TCU of a vehicle, the TCU 402 sends RAND and AUTN via an authenticate command to the SE/SIM on the TCU. The SE/SIM runs AKA to validate RAND and AUTN, generated using a pre-shared key during network attachment procedure, which uses pre-shared key at index KIDX. If they are valid, the server is authenticated and the SE/SIM returns the TCU with RES and a session key Ks (Ks=CK∥K) via step 426. This RES is then used as a password during HTTP Digest authentication with MSISDN as username via step 428. The authentication and authorization server validates this RES against the stored AV, if it matches, uses a predetermined, preselected and/or preassigned bootstrap transaction identifier (B-TID) and derive Ks (Ks=CK∥IK) via step 430. B-TID is a lifetime identifier or a long-term key where TID is a transaction identifier as shown in step 432. Client key exchange (3gpp-gba, B-TID) is matched with MATT server at step 434 and Authentication and authorization server identifier B-TID at step 336 and generated session key Ks at step 438 as illustrated in FIGS. 3A and 3B and shown below.
TCU→A2: step 328. HTTP Digest\n(username=MSISDN, password=RES)
A2 406 validate RES against the stored AV and uses a Bootstrap Transaction Identifier (B-TID) and derive Ks (Ks=CK∥IK) if RES is validated via step 430. The Bootstrap Transaction Identifier (B-TID) may be predetermined, preselected and/or preassigned.
A2→TCU: step 432. 200 OK\n(B-TID, key lifetime)
end alt
TCU→MQTT: step 434. Client_Key_Exchange\n(3gpp-gba, B-TID)
MQTT→A2: step 436. B-TID
A2→MQTT: step 438. Ks TLS hand-shake is completed via steps 440 through 446 as illustrated in FIG. 4B and as shown below:
TCU→MQTT: step 440. Change_Cipher_Spec
TCU→MQTT: step 442. Finished
MATT→TCU: step 444. Change_Cipher_Spec
MQTT→TCU: step 446. Finished Both sides TCU 402 as well as app server (MATT) 404 now share the same key Ks which TLS will use to encrypt subsequent messages as shown in step 448. The IoT device, for example, a TCU connects with the application server (MATT server) using username B-TID which does not require any password via step 450. A connection acknowledgement is sent back as Code=0, or accepted, which means the device and the network operator server are now authenticated via step 452 is illustrated in FIG. 4B and as shown below.
TCU→MQTT: step 450. MQTT Connect\n(username=B-TID, no password)
MQTT→TCU: step 452. MQTT Connack\n(code=0, accepted)

The IoT device 402, for example, a TCU may then communicate with the application (MQTT) server via secure data channel.

Although LTE is used to explain the working of the present invention in one or more embodiments described above, the same procedure may also work on High-Speed Downlink Packet Access (HSDPA)/Edge/GSM networks and CDMA networks.

The method illustrated in FIGS. 4A and 4B has numerous advantages along with other advantages described earlier, as it does not require any certificate. Additionally, the process does not require encryption but is still resistant to man-in-the-middle attack. Also, the process does not require modification to MQTT and results in considerable reduction in OTA data consumption because a TCU does not need to download a certificate over the air.

Figure 5:
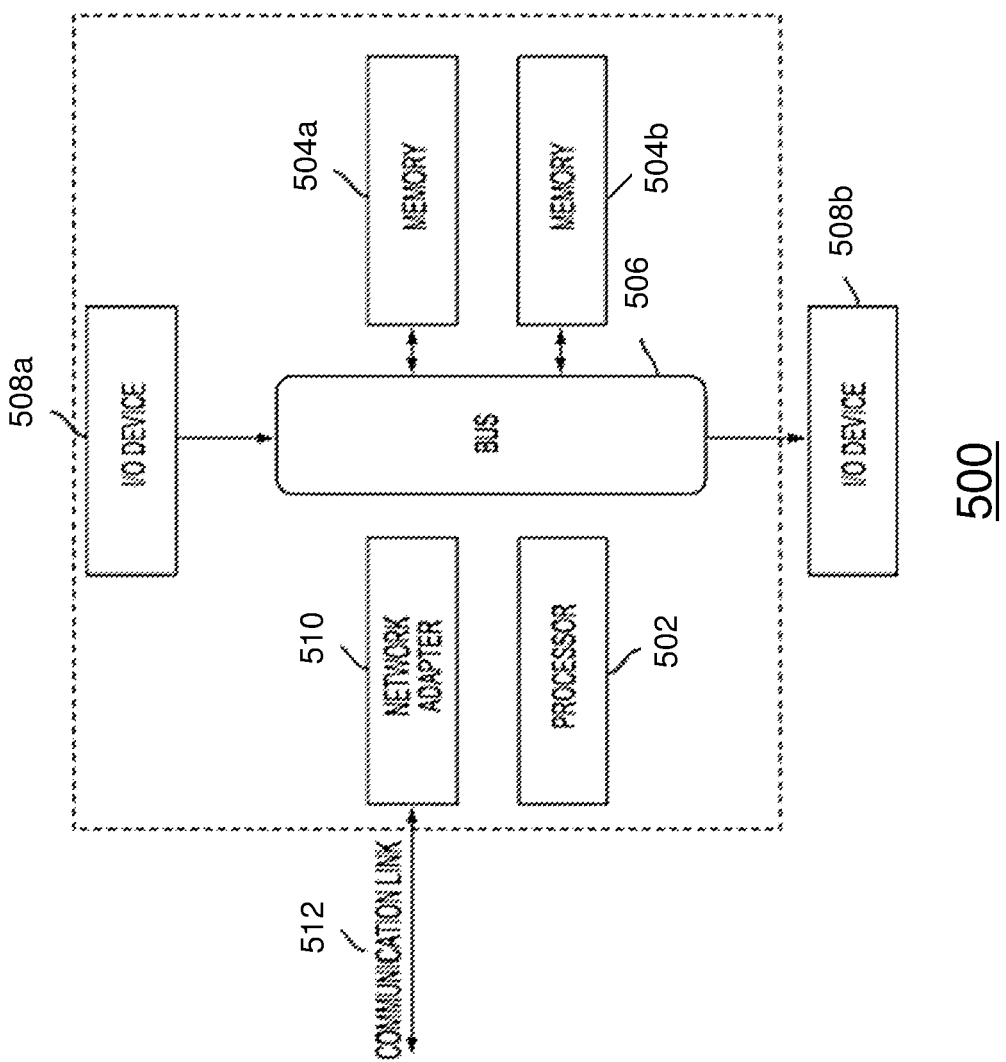
FIG. 5 illustrates a data processing system 500 suitable for storing the computer program product and/or executing program code relating to the choices of the users in accordance with an embodiment of the present invention.

FIG. 5 illustrates a data processing system 500 suitable for storing the computer program product and/or executing program code in accordance with an embodiment of the present invention. The data processing system 500 includes a processor 502 coupled to memory elements 504*a-b* through a system bus 506. In an embodiment, the data processing system 500 may include more than one processor and each processor may be coupled directly or indirectly to one or more memory elements through a system bus.

Memory elements 504*a-b* can include local memory employed during actual execution of the program code, bulk storage, and cache memories that provide temporary storage of at least some program code in order to reduce the number of times the code must be retrieved from bulk storage during execution. As shown, input/output or I/O devices 508*a-b* (including, but not limited to, keyboards, displays, pointing devices, etc.) are coupled to the data processing system 500. I/O devices 508*a-b* may be coupled to the data processing system 500 directly or indirectly through intervening I/O controllers (not shown).

In FIG. 5, a network adapter 510 is coupled to the data processing system 502 to enable data processing system 502 to become coupled to other data processing systems or remote printers or storage devices through communication link 512. Communication link 512 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (COMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for secure authentication of Internet of Things (IoT) device comprises:
    establishing a network connection with a network operator server via a control channel;
    establishing identity of the network operator server using a pre-shared server key from one or more of pre-shared server keys for secure authentication of the network operator server;
    establishing identity of the IoT device using a pre-shared client key from one or more of pre-shared client keys for secure authentication of the IoT device;
    cryptographically generating a pair of network session keys for a network session based on a life time identifier for a network session to allow secure data exchange between the network operator server and the IoT device, wherein one of the pair of network session keys is for the IoT device and the other is for the network operator server; and
    using the cryptographically generated pair of network session keys for securely authenticating application running on the authenticated IoT device.

2. The method of claim 1, wherein the pre-shared client key and the pre-shared server key are same.

3. The method of claim 1, wherein the pre-shared client key and the pre-shared server key are different.

4. The method of claim 1, wherein the cryptographically generated pair of network session keys are such that one network session key is used by the network operator server and the other network session key is used by the IoT device.

5. The method of claim 1, wherein the one or more pre-shared server keys and the one or more pre-shared client keys are stored securely in the Subscriber Identity Module as a secure element (SE/SIM) and are distributed to the IoT device when the IoT device is provisioned with the SE/SIM.

6. A system for secure authentication of Internet of Thing (IoT) devices comprises:
    a secure element including a processor, wherein the secure element establishes a network connection with a network operator server via a control channel, and
    wherein the secure element establishes identity of the network operator server using a pre-shared server key from one or more of pre-shared server keys, and identity of the IoT device using a pre-shared client key from one or more of pre-shared client keys; and
    a session key generator including a processor, wherein the session key generator cryptographically generates a pair of session keys for a network session based on a life time identifier for a network session to allow data exchange between the network operator server and the IoT device,
    wherein one of the pair of network session keys is for the IoT device and the other is for the network operator server, and
    wherein the cryptographically generated pair of network session keys are used for securely authenticating application running on the authenticated IoT device.

7. The system of claim 6, wherein the pre-shared client key and the pre-shared server key are same.

8. The system of claim 6, wherein the pre-shared client key and the pre-shared server key are different.

9. The system of claim 6, wherein the cryptographically generated pair of network session keys are such that one network session key is used by the network operator server and the other network session key is used by the IoT device.

10. The system of claim 6, wherein the one or more pre-shared server keys and the one or more pre-shared client keys are store securely in the Subscriber Identity Module as a secure element (SE/SIM) and are distributed to the IoT device when the IoT device is provisioned with the SE/SIM.

11. A computer program product stored on a non-transitory computer readable medium for secure authentication of Internet of Things (IoT) devices, comprising computer readable instructions for causing a computer to control an execution of an application for secure authentication of IoT devices comprising:
    establishing a network connection with a network operator server via a control channel;
    establishing identity of the network operator server using a pre-shared server key from one or more of pre-shared server keys for secure authentication of the network operator server;
    establishing identity of the IoT device using a pre-shared client key from one or more of pre-shared client keys for secure authentication of the IoT device;
    cryptographically generating a pair of network session keys for a network session based on a life time identifier for a network session to allow data exchange between the network operator server and the IoT device wherein one of the pair of network session keys is for the IoT device and the other is for the network operator server, and; and
    using the cryptographically generated pair of network session keys for securely authenticating application running on the authenticated IoT device.

12. The computer program product of claim 11, wherein the pre-shared client key and the pre-shared server key are same.

13. The computer program product of claim 11, wherein the pre-shared client key and the pre-shared server key are different.

14. The computer program product of claim 11, wherein the cryptographically generated pair of network session keys are such that one network session key is used by the network operator server and the other network session key is used by the IoT device.

15. The computer program product of claim 11, wherein the one or more pre-shared server keys and the one or more pre-shared client keys are store securely in the Subscriber Identity Module as a secure element (SE/SIM) and are distributed to the IoT device when the IoT device is provisioned with the SE/SIM.

* * * * *